United States Patent
Lopez et al.

(10) Patent No.: US 8,033,762 B2
(45) Date of Patent: Oct. 11, 2011

(54) PNEUMATIC CONVEYOR

(75) Inventors: Remy Lopez, Octeville sur Mer (FR);
Zmaj Petrovic, Octeville sur Mer (FR);
Nicolas Cantisani, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 12/087,256

(22) PCT Filed: Dec. 22, 2006

(86) PCT No.: PCT/FR2006/051417
§ 371 (c)(1),
(2), (4) Date: Jun. 26, 2008

(87) PCT Pub. No.: WO2007/074306
PCT Pub. Date: Jul. 5, 2007

(65) Prior Publication Data
US 2009/0016827 A1    Jan. 15, 2009

(30) Foreign Application Priority Data
Dec. 27, 2005  (FR) ..................................... 05 54112

(51) Int. Cl.
*B65G 51/24* (2006.01)
(52) U.S. Cl. ........................... 406/182; 406/88; 406/196
(58) Field of Classification Search .................... 406/88, 406/182, 196
See application file for complete search history.

(56) References Cited

U.S. PATENT DOCUMENTS

| | | | | |
|---|---|---|---|---|
| 721,743 | A * | 3/1903 | Richmond | 406/182 |
| 3,075,625 | A * | 1/1963 | Randall | 198/380 |
| 3,580,640 | A * | 5/1971 | Eriksson | 406/19 |
| 4,138,161 | A * | 2/1979 | Payne | 406/155 |
| 5,421,678 | A * | 6/1995 | Aidlin et al. | 406/88 |
| 5,630,679 | A * | 5/1997 | Simkowski et al. | 406/86 |
| 5,931,611 | A * | 8/1999 | Worsham | 406/182 |
| 6,062,773 | A * | 5/2000 | Ouellette | 406/88 |
| 6,074,136 | A * | 6/2000 | Steele | 406/182 |
| 6,374,992 | B1 * | 4/2002 | Simkowski | 198/626.1 |
| 6,494,646 | B1 * | 12/2002 | Sala | 406/88 |
| 6,516,810 | B1 * | 2/2003 | Haul | 131/282 |
| 6,709,203 | B2 * | 3/2004 | McKinnis | 406/3 |
| 6,854,586 | B1 * | 2/2005 | VanderMeer et al. | 198/436 |
| 6,854,589 | B2 * | 2/2005 | Larsen | 198/680 |

* cited by examiner

*Primary Examiner* — Joseph A Dillon, Jr.
(74) *Attorney, Agent, or Firm* — The Watson I.P. Group, PLC; Jovan N. Jovanovic; Vladan M. Vasiljevic

(57) ABSTRACT

A pneumatic conveyor having upstream (1) and downstream (2) tubular transport channels which are interconnected by a switch device (3) and a support infrastructure (4). The switch device (3) takes the form of a transport and guiding device which is flexible in relation to the longitudinal axis thereof and which is a flexible blade. The flexible blade supports a device (10) for propelling products (6) to be transported, which includes individual rigid parallelepiped elements (18). One end (3') of the flexible transport and guiding structure is fixed to the support infrastructure (4) or to an upstream (1) or downstream (2) transport case, such that the guide part thereof corresponds to that of a downstream (2) or upstream (1) transport case, while the other end (3) of the flexible transport and guiding structure is guided with possible angular displacement on the support infrastructure (4) or on an upstream (1) or downstream (2) transport case and is connected to a reciprocating displacement means (5). The pneumatic conveyor is used the transport of loads typically using overhead pneumatic conveyors.

15 Claims, 7 Drawing Sheets

US 8,033,762 B2

PNEUMATIC CONVEYOR

The present invention concerns the field of transporting loads by means of overhead pneumatic conveyors, and its object is a switching device for such pneumatic conveyors.

Overhead pneumatic conveyors are designed to transport relatively light products guided in a rail of these conveyors by the action of a flow of compressed air on these products at the point where they are guided in the rail.

For this purpose, these overhead pneumatic conveyors are in the form of cases having a guide rail in their lower part for the products to be transported, whereby this rail is equipped on the one hand at regular intervals with nozzles for ejecting compressed air in the direction of transport of the products, and on the other hand, under the rail, with means for keeping the upper part of the products in the rail. The case is supplied with compressed air via corresponding supply lines and is provided, among other things, with means of control in the form of sensors or other devices connected to a central control unit via electrical cables. The set of these cases is mounted on a support structure.

To make it possible for the products to change direction, be rearranged, or be distributed in different directions, the cases are connected to one or more switching devices that are an integral part of these cases. These switching devices generally have a moving cassette that moves transversally relative to the longitudinal axis of the cases, and this moving cassette itself is inserted into a fixed unit equipped with transverse guides for the cassette and tubular sections coupling the cases, successively following a switching channel for the moving cassette.

On the sides where it connects, such a moving cassette has a number of inlets or outlets for switching cases that are connected together and designed to cooperate with the corresponding end of one or the other of the coupling cases of the tubular cases upstream and downstream of the moving cassette, so as to allow another orientation of the transported products. The transverse movement of the moving cassette is accomplished by means of a jack-type actuator, which carries out the successive couplings between the switching cases and the coupling cases of the transport cases as necessary.

These known switching devices therefore have a relatively cumbersome and complicated design requiring multiple means for guiding and moving the moving part, as well as significant means for sealing the switching device, both where it couples with the tubular transport channels and at the moving cassette.

In addition, in the case of a switching device with more than two inlet or outlet tubular channels, the size of the moving cassette, in particular its transverse size, causes a functional inertia that limits the product transfer rates between upstream and downstream or vice versa. This is more specifically due to the fact that a minimum path is needed for the moving cassette in order to take into account the minimum space needed between the tubular transport channels.

For this purpose, also known from U.S. Pat. No. B-6,854,589 is a switching device with a flexible rod on which are mounted guide means hinged by straps. Such a design is complicated and cumbersome and uses numerous identical individual means or parts that are hinged together and onto the flexible rod.

The goal of the present invention is to solve these problems by proposing a pneumatic conveyor with a switching device making it possible to make a coupling between an upstream or downstream tubular transport case and a number of downstream or upstream tubular transport cases, simply and with a significant reduction in inertia, favoring an increase in output compared to the devices known to date.

For this purpose, the pneumatic conveyor according to the invention, which essentially consists of upstream and downstream transport cases connected together by a switching device and by a support infrastructure, is characterized by the fact that the switching device is in the form of a transport and guide means that is flexible relative to its longitudinal axis and consists of a blade of flexible material supporting a means for propelling the products or bottles to be transported or conveyed that consists essentially of individual rigid box-shaped parts attached to one end of the support infrastructure or to an upstream or downstream transport case, with a guide part corresponding to that of a downstream or upstream transport case. The other end of this flexible transport and guide means is guided with possible angular movement on the support infrastructure or on an upstream or downstream transport case, and is connected to a reciprocating movement means.

The invention will be better understood thanks to the description that follows with respect to a preferred embodiment given as a non-limiting example and explained with reference to the attached schematic drawings, in which.

Figure 1:
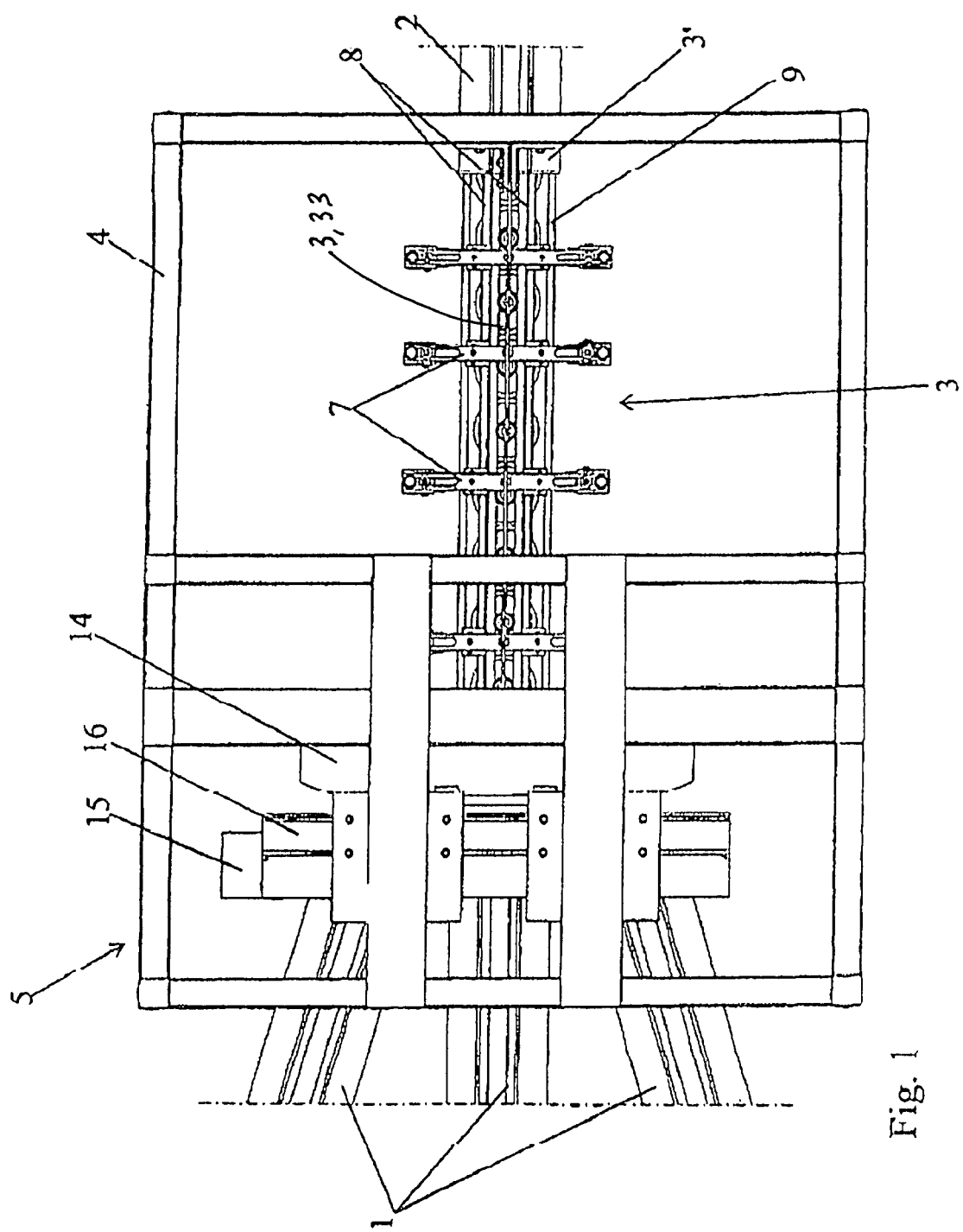
FIG. 1 is a partial plane view of a pneumatic conveyor according to the invention.
Figure 2:
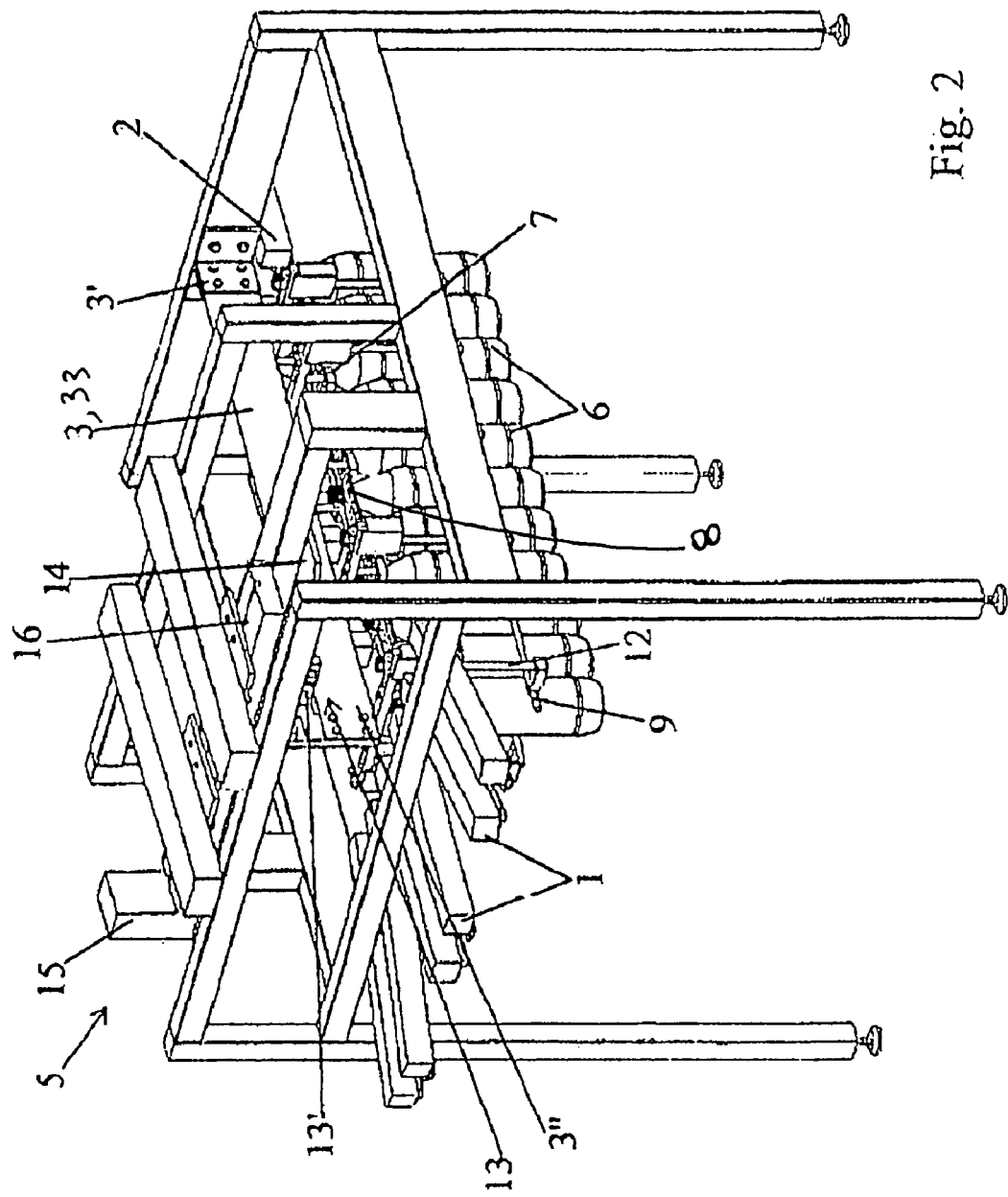
FIG. 2 is a perspective view of the pneumatic conveyor according to FIG. 1.

FIGS. 1 and 2 of the attached drawings show, as an example, a pneumatic conveyor that essentially consists of upstream 1 and downstream 2 transport cases connected by a switching device 3, whereby all of this is mounted under a support infrastructure 4. In the attached drawings, the upstream 1 and downstream 2 transport cases are generally shown by their guide section attached to the switching device 3, and for reasons of clarity, their airtight ducts for receiving compressed air in order to propel the products to be conveyed or transported are shown only partially in FIG. 4.

According to the invention, the switching device 3 is made in the form of a guide and transport means that is flexible with respect to its longitudinal axis and consists of a blade of flexible material supporting a means 10 for propelling the products or bottles 6 to be transported or conveyed and consisting essentially of individual rigid box-shaped parts attached to one end 3' of the support infrastructure 4 or to an upstream 1 or downstream 2 transport case, with its guide part corresponding to that of an upstream 1 or downstream 2 transport case (not shown). The other end 3" of this flexible transport and guide means is guided with possible angular movement on the support infrastructure 4 or on an upstream 1 or downstream 2 transport case and is connected to a reciprocating movement means 5. Thus the free end 3" of the flexible transport and guide means forming the switching device 3 can be brought into different positions in which its guide part cooperates with that of a downstream transport case 2.

In the embodiment described with respect to the attached drawings, it is considered that the products to be transported, in this case bottles 6, are brought by a single upstream transport case 1 and can be directed, by means of the switching device 3, toward any one of three downstream transport cases 2. But it is also possible to provide transport in the opposite direction, having bottles 6 coming from different directions taken up by a single pneumatic conveyor.

The flexible transport and guide means forming the switching device 3 and consisting of: a blade 33 made of flexible material is advantageously bolted by its end 3' to the support infrastructure 4. This blade, constituting the flexible transport and guide means forming the switching device 3, supports the means 10 for propelling the products or bottles 6 to be transported or conveyed, which is provided on the one hand with supports 7 or means 8 for guiding and holding in place the products or bottles 6 to be transported or conveyed, and on the other hand with devices 11 for mounting additional guide means 9 for the lower part of the products or bottles 6 to be transported or conveyed.

The supports 7 are in the form of shaped parts or rods attached under the lower part of the means 10 for propelling the products or bottles 6 to be transported or conveyed, and the means 8 for guiding and holding in place are attached to them. The devices 11 for mounting the additional guide means 9 for the lower part of the products or bottles 6 to be transported or conveyed are in the form of shaped or squared parts equipped with suspended parts 12 for attaching the additional guide means 9 for the lower part of the product or bottles 6.

In order to allow adjustment of the guides to geometric changes in the switching device 3 in the course of switching to one or the other upstream 1 or downstream 2 case, the means 8 for guiding and holding in place, as well as the additional guide means 9, are clamped onto the respective supports 7 and mounting devices 11 near the fixed end 3' of the flexible blade forming the switching device 3, while on the remaining supports 7 and mounting devices 11 they are mounted so as to be able to move by sliding where they join the means 8 for guiding and holding in place and the additional guide means 9.

Figure 6:
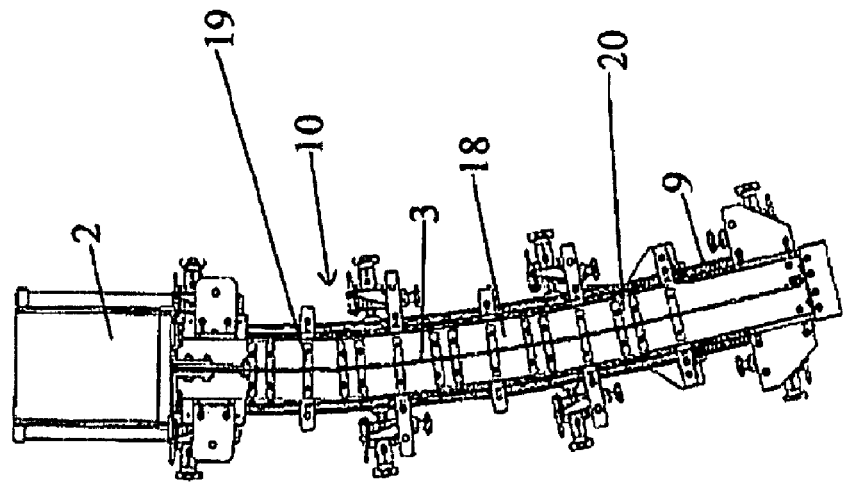
FIGS. 5 and 6 are top views showing the switching device alone, respectively in an unswitched and switched position.

Thus when the switching device 3 bends to the left (FIG. 6) or to the right (not shown), the means 8 for guiding and holding in place and the additional guide means 9 are held by the supports 7 and the mounting devices 11 near the end 3' and can move relative to the other supports and devices, so that they can adjust to bends in the horizontal plane of the switching device 3 and ensure consistency in guiding and holding in place the products or bottles 6 to be transported or conveyed.

Because of this possible relative movement of the means 8 for guiding and holding in place and the additional guide means 9, it is also possible to ensure perfectly continuous guiding of the products or bottles to be transported or conveyed.

According to another characteristic of the invention that is not shown in the attached drawings, the supports 7 of the means 8 for guiding and holding in place and the mounting devices 11 for the additional guide means 9 are advantageously mounted on the means 10 for propelling the products or bottles 6 to be transported or conveyed, in such a way as to be able to move relative to the longitudinal axis of this latter and therefore of the blade of flexible material forming the switching device 3. Such a movement can be accomplished by means of jacks simultaneously forming a transverse guide support for the supports 7 of the means 8 for guiding and holding in place and for the mounting devices 11 for the additional guide means 9. Thus it is possible to control the degree of separation of the means 8 for guiding and holding in place and the additional guide means 9 as a function of the products or bottles 6 to be transported or conveyed.

Figure 8:
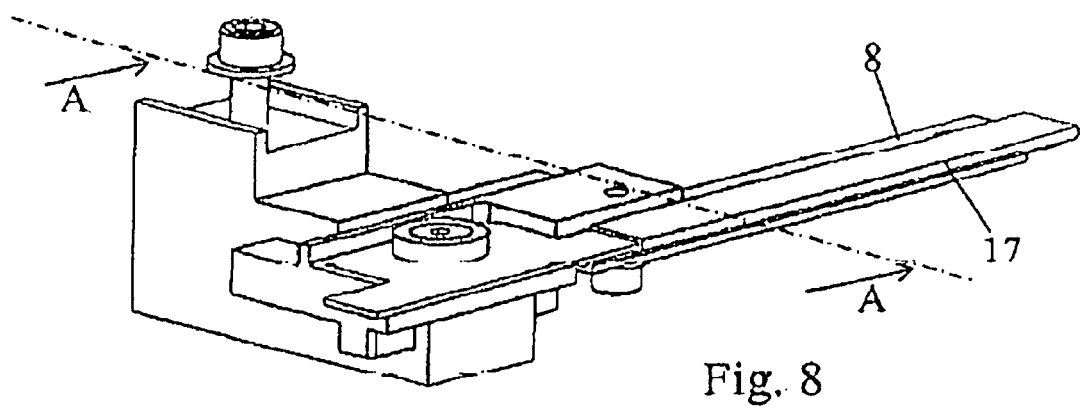
FIG. 8 is a perspective view of one end of a means for guiding and holding in place the products or bottles.
Figure 9:
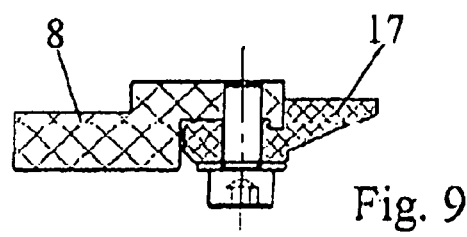
FIG. 9 is a cross section along A-A of FIG. 8.
Figure 10:
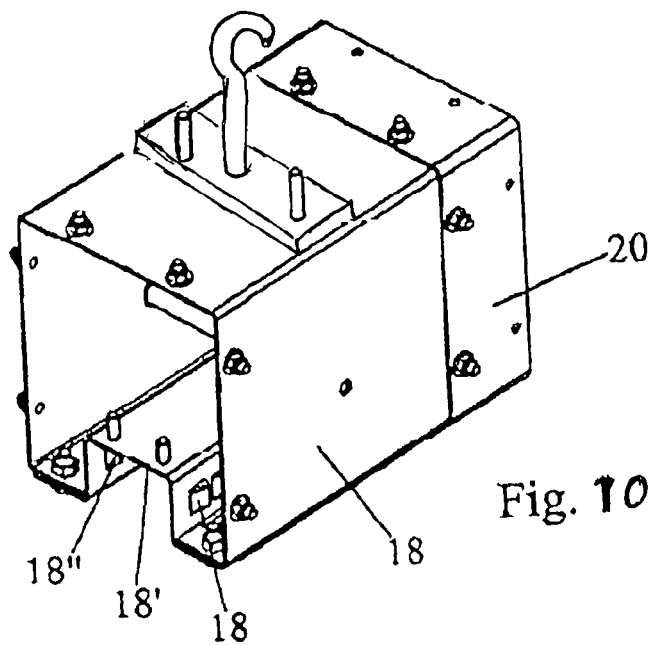
FIG. 10 is a perspective view of a part of the means for propelling the transported and guided products of the switching device.
Figure 11:
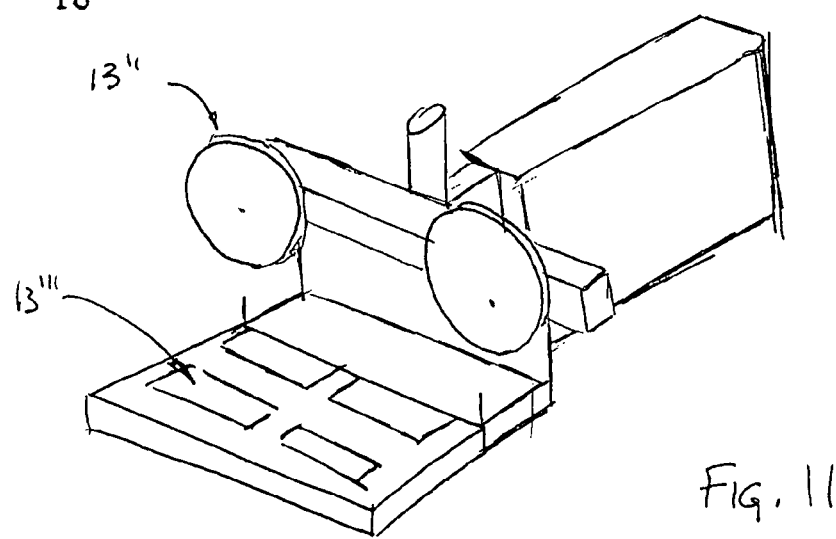
FIG. 11 is a perspective view of a part of the device showing the runners and rollers.

Preferably, as shown in FIGS. 8 and 9 of the attached drawings, the means 8 for guiding and holding in place the upper ends of the products or bottles 6 to be transported or conveyed are advantageously each provided, on the side of the free end 3" of the switching device 3, with an extension 17 cooperating with the corresponding end of the means 8 for guiding and holding in place the upper ends of the product or bottles 6 to be transported or conveyed of the upstream 1 or downstream 2 cases, to ensure that the products or bottles 6 to be transported or conveyed pass through without bumping. This extension 17 is advantageously in the form of a plate attached to the free end of the means 8 for guiding and holding in place the upper ends of the products or bottles 6 to be transported or conveyed, whereby this attached plate has a slanted lower face designed to overlap, when the means for guiding are aligned, the corresponding end of the means 8 for guiding and holding in place the upper ends of the products or bottles 6 to be transported or conveyed of the upstream 1 or downstream 2 cases, and this latter end extends slightly under the level of the rest of the means for guiding.

Thus when the switching device is in working position, the extension 17 formed by the plate attached to the end of the means 8 for guiding and holding in place the upper ends of the products or bottles 6 to be transported or conveyed rests its slanted lower face on the corresponding end of the means for guiding and holding in place the upper ends of the products or bottles 6 to be transported or conveyed of the upstream 1 or downstream 2 cases, and makes it possible for these products or bottles 6 to be transported or conveyed to pass through without bumping.

Thus when pivoting to the right (FIG. 6) or to the left (not shown), the means 8 for guiding and holding in place located inside the radius of curvature will move into the supports 7 and therefore go past the free end 3' of the switching device 3. Because of the extension 17 on this means 8 for guiding and holding in place, the guiding consistency is always completely ensured, while preventing the ends of successive means for guiding from jamming together.

With respect to the additional guide means 9, it is possible to have them be slightly shorter near the free end 3' of the switching device 3, so that a lack of contact with the corresponding end of the corresponding means upstream or downstream is not absolutely unacceptable, since these additional guide means 9 rest on a broader section of the products or bottles 6 to be conveyed or transported and there is thus no risk of a gap in this additional guide.

Figure 3:
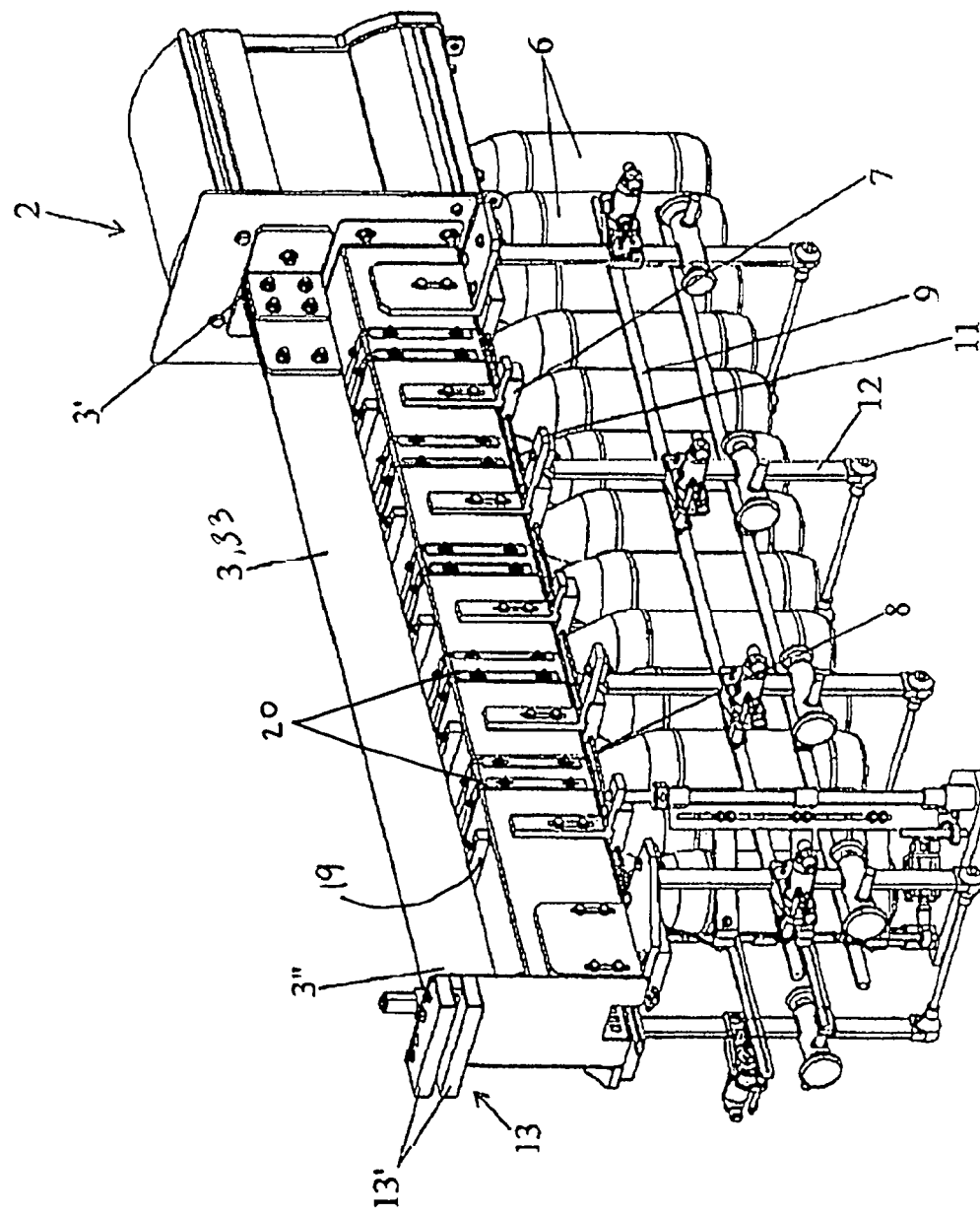
FIG. 3 is a perspective view of the switching device alone.

The individual rigid box-shaped parts 18 that make up the means 10 for propelling the products or bottles 6 to be transported or conveyed (FIG. 7) are each connected to a crosspiece 19 that is part of the base of the flexible blade constituting the flexible transport and guide means forming the switching device 3, as well as being connected together by means of expandable parts 20 (FIG. 3). The supply of compressed air for the means 10 for propelling the products or bottles 6 to be transported or conveyed is provided in a known manner by means of corresponding supply lines that are not shown.

Figure 7:
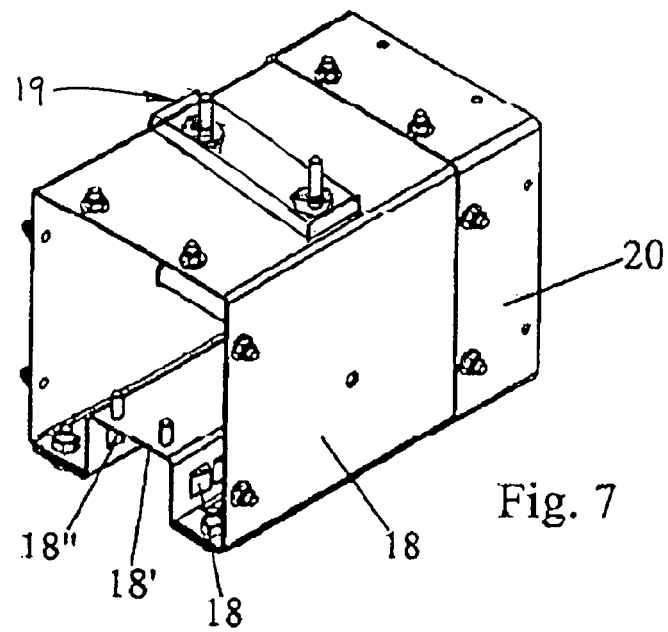
FIG. 7 is a perspective view of a part of the means for propelling the transported and guided products of the switching device.

As shown more specifically in FIG. 7 of the attached drawings, each individual rigid box-shaped part 18 is in the form of a case forming a guide rail 18' in its lower part for the products or bottles 6 to be transported or conveyed, whereby this guide rail 18' of the individual rigid box-shaped parts 18 forming the means 10 for propelling the products or bottles 6 is equipped with inlets or nozzles 18" for blowing compressed air in the direction of transport of the products or bottles 6 to be transported or conveyed and cooperates with the means 8 for guiding and holding in place the upper ends of the products or bottles 6 to be transported or conveyed.

Thus it is possible to provide complete guiding and propulsion of the products or bottles 6 to be transported or conveyed during their transfer in the switching device 3, regardless of the position of the switching device 3, that is, in a position of direct passage or in a switched position.

Moreover, according to another characteristic of the invention, each crosspiece 19 for an individual rigid box-shaped part 18 is attached to the base of the flexible blade constituting the flexible transport and guide means forming the switching device 3, either by short weld spots or by hooking a hook in the middle of its upper part into a corresponding hole made in the switching device 3. Such an embodiment makes it possible to ensure consistent flexibility of the flexible blade constituting the flexible transport and guide means forming the switching device 3. In fact, it is necessary to avoid or at least limit any risk of local rigidity of this blade so as to allow for proper bending during successive switching operations.

Thus a consistent flexibility is guaranteed by such attachment by small weld spots. Using a hook also makes possible the mutual independence of the crosspieces 19 and the switching device 3.

The supports 7 of the means 8 for guiding and holding in place and the mounting devices 11 for the additional guide means 9 are preferably each mounted on an individual rigid box-shaped part 18 forming the means 10 for propelling the products or bottles 6 to be transported or conveyed, and the individual rigid box-shaped parts 18 are modular and are connected together by expandable parts 20 that are also modular, whereby the individual rigid box-shaped parts 18 are mounted on the flexible blade forming the switching device 3, at regular intervals, by means of their crosspiece 19. Thus geometric variations in the switching device 3 in the course of switching operations to one or the other upstream 1 or downstream 2 case can be readily compensated for.

According to one variant of the invention not shown in the attached drawings, it is also possible to make the individual rigid box-shaped parts 18 in the form of parts with progressively increasing length from the fixed end 3' of the flexible blade forming the switching device 3 in the direction of the free end 3" of this blade, whereby the crosspieces 19 of the individual rigid box-shaped parts 18 are distributed over the length of the flexible blade forming the switching device 3 with a spacing that increases from the fixed end 3' of the flexible blade forming the switching device 3 in the direction of the free end 3" of this blade, and the expanding parts 20 are the same. Such a design of the parts 18 makes it possible to have an optimum adjustment to geometric variations in the switching device.

The free end 3" of the flexible transport and guide means forming the switching device 3 is equipped with a guide device 13 on the support infrastructure 4 that consists essentially of a sliding guide that fits around a guide plate or track 14 that is part of the support infrastructure 4. The sliding guide forming the guide device 13 on the support infrastructure 4 preferably consists of two sliding parts 13' running parallel on each side of the guide plate or track 14 that is part of the support infrastructure 4, resting above and below against the corresponding faces of the guide plate or track 14 and attached to the free end 3" of the flexible transport and guide means forming the switching device 3. These sliding parts 13' are made of a material with a low friction resistance or are provided with a coating with a low friction resistance. This sliding guide forming the guide device 13 can also consist of sliding runners or rollers or other parts mounted on the free end 3" of the flexible transport and guide means forming the switching device 3.

Figure 5:
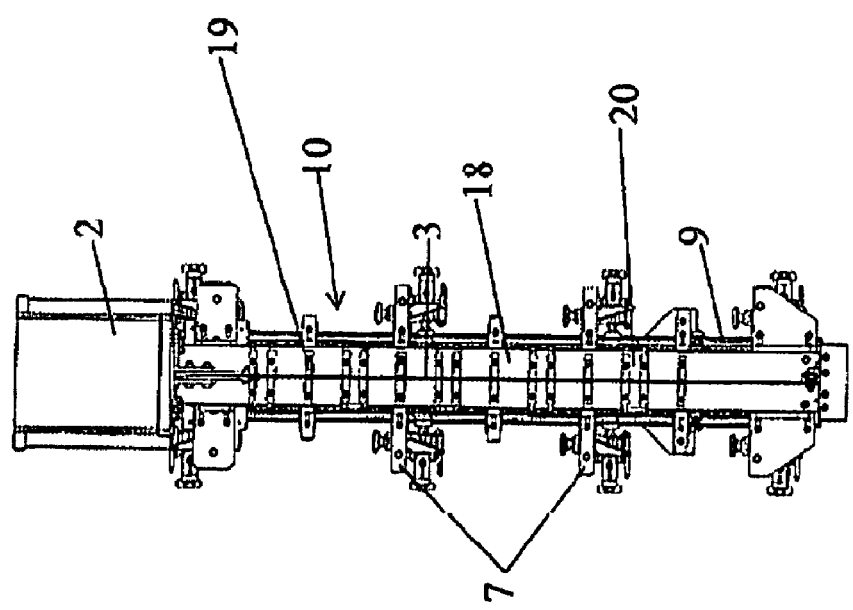

Thus when the free end 3" of the switching device 3 is moved under the effect of the reciprocating movement means 5, by simultaneously resting on either side of the guide plate or track 14, the guide device 13 ensures correct positioning without twisting of the free end 3" of the switching device 3 and prevents any risk of blockage during movement, while guaranteeing the correct positioning of that end with its guide means in each switching position or in its straight-through conveying or transporting position (FIG. 5).

The reciprocating movement means 5 preferably consists of at least one double-acting jack 15 that is pneumatic, electrical, or mechanical and whose piston rod is connected to the free end 3" of the flexible transport and guide means forming the switching device 3 by means of a guide cap 16 on the support infrastructure 4 that extends from the free end 3" and acts as a connector to that free end 3". Such a double-acting jack 15 makes it possible, for example, to switch the switching device 3 from the position shown in FIG. 5 to the position shown in FIG. 6 or to the opposite position (not shown) in a very short period of time.

Figure 4:
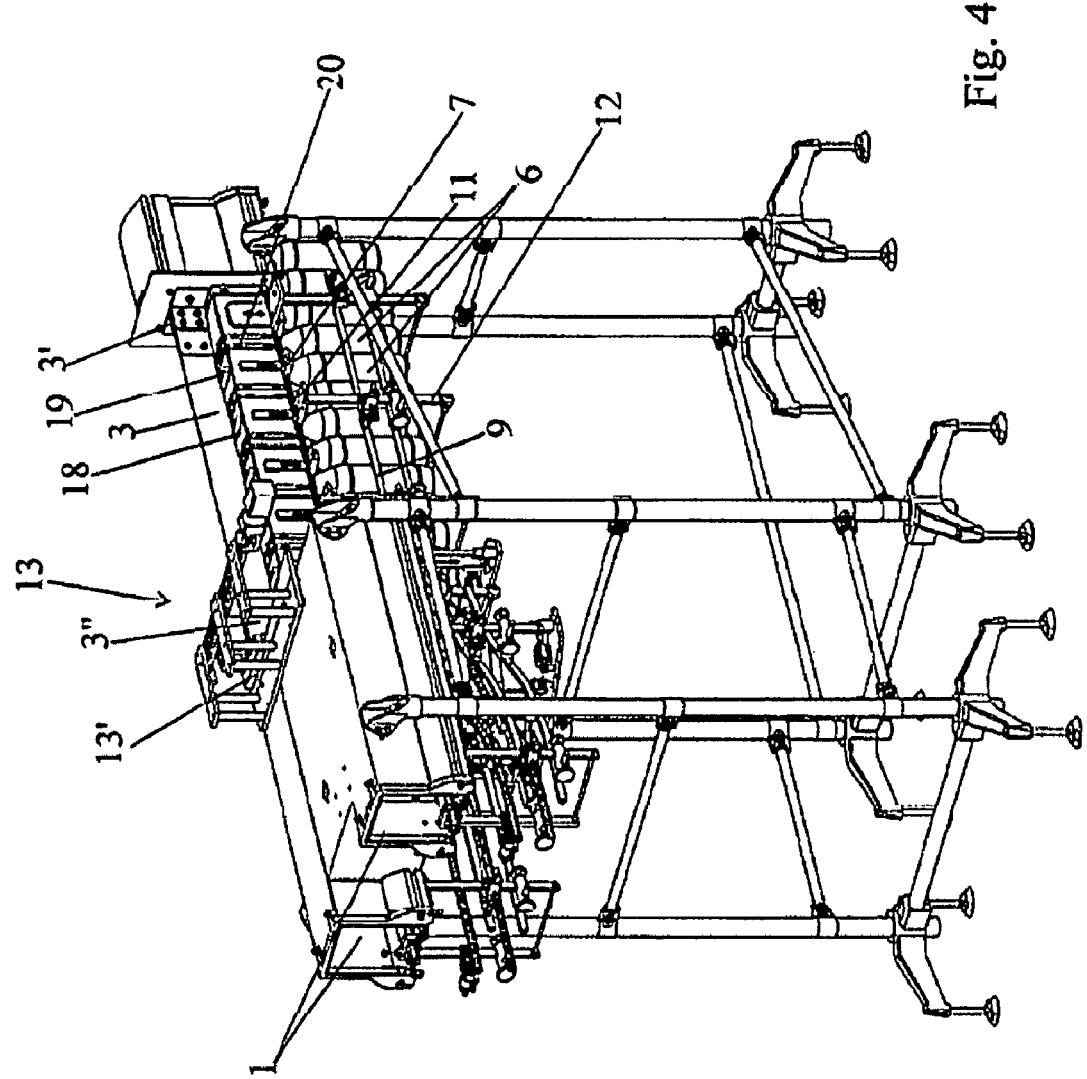
FIG. 4 is a view analogous to that of FIG. 2 on a smaller scale, where the switching device is equipped with a means for propelling the transported and guided products.

FIG. 4 of the attached drawings shows an embodiment of the invention in which the free end 3" of the flexible transport and guide means forming the switching device 3 is equipped with a guide device 13 attached to the upstream transport case 1 or the downstream transport case 2.

Thanks to the invention, it is possible to make switching devices for an overhead pneumatic conveyor that make it possible to make very rapid changes in the routes of the products to be conveyed or transported because of a significant reduction in the inertia of the switching device itself, and therefore to improve the outputs of conveyors thus equipped.

In addition, the new switching device according to the invention is a much simpler design than the devices existing to date, and is therefore clearly less expensive to make.

Of course, the invention is not limited to the embodiment described and shown in the attached drawings. Modifications are still possible, in particular from the standpoint of the nature of the various parts or the substitution of equivalent techniques, without leaving the scope of protection of the invention.

The invention claimed is:

1. A pneumatic conveyor having upstream (1) and downstream (2) transport cases connected together by a switching device (3) and by a support infrastructure (4), the switching device (3) being in the form of a transport and guide means that is flexible relative to its longitudinal axis and includes a blade (33) of flexible material supporting a means (10) for pneumatically propelling the products (6) to be transported which is provided with means of guidance (8) for guiding and holding in place the products (6) to be transported, and with devices (11) for mounting additional means of guidance (9) for the lower part of the products (6) to be transported attached to one end (3') of the support infrastructure (4) or to an upstream (1) or downstream (2) transport case, with the means of guidance for guiding and the additional means of guidance (8,9) corresponding to that of a downstream (2) or upstream (1) transport case, the other end (3") of this flexible transport and guide means is guided with a possible angular movement on the support infrastructure (4) or on an upstream (1) or downstream (2) transport case, and is connected to a reciprocating movement means (5), the means (8) for guiding and holding in place the upper ends of the products (6) to be transported are each provided, on the side of the other end (3") of the switching device (3), with an extension (17) cooperating with the corresponding end of the means (8) for guiding and holding in place the upper ends of the product (6) to be transported of the upstream (1) or downstream (2) cases, to ensure that the products (6) to be transported pass through without bumping, by resting a lower face thereof on the corresponding end of the means for guiding and holding in place the upper ends of the products (6) to be transported of the upstream (1) or downstream (2) cases, wherein the extension (17) is in the form of an attached plate attached to the free end of the means (8) of guidance and holding in place the upper ends of the products (6) to be transported , whereby the attached plate has a slanted lower face designed to overlap, when the means for guidance are aligned, the corresponding end of the means (8) for guidance and holding in place the upper ends of the products or bottles (6) to be transported or conveyed of the upstream (1) or downstream (2) cases, and the corresponding end extends slightly under the level of a remaining portion of the means of guidance (8).

2. Pneumatic conveyor according to claim 1, characterized by the fact that the supports (7) are in the form of shaped parts attached under the lower part of the means (10) for propelling the products (6) to be transported, and the means (8) for guiding and holding in place are attached to them, the devices (11) for mounting the additional guide means (9) for the lower part of the products (6) to be transported are in the form of one of shaped and squared parts equipped with suspended parts (12) for attaching the additional guide means (9) for the lower part of the product (6).

3. Pneumatic conveyor according to claim 1, characterized by the fact that the means (8) for guiding and holding in place, as well as the additional guide means (9), are clamped onto the respective supports (7) and mounting devices (11) near the fixed end (3') of the flexible blade forming the switching device (3), while on the remaining supports (7) and mounting devices (11) they are mounted so as to be able to move by sliding where they join the means (8) for guiding and holding in place and the additional guide means (9).

4. Pneumatic conveyor according to claim 1, characterized by the fact that the supports (7) of the means (8) for guiding and holding in place and the mounting devices (11) for the additional guide means (9) are mounted on the means (10) for propelling the products or bottles (6) to be transported or conveyed, in such a way as to be able to move relative to the longitudinal axis of this latter and therefore of the blade of flexible material forming the switching device (3).

5. Pneumatic conveyor according to claim 4, characterized by the fact that the movement of the supports (7) of the means (8) for guiding and holding in place and the mounting devices (11) for the additional guide means (9) on the means (10) for propelling the products (6) to be transported is accomplished by means of jacks simultaneously forming a transverse guide support for the supports (7) of the means (8) for guiding and holding in place and for the mounting devices (11) for the additional guide means (9).

6. Pneumatic conveyor according to claim 1, characterized by the fact that the means (1) for propelling the products to be transported comprise individual rigid box-shaped parts (18) are each connected to a crosspiece (19) that is part of the base of the flexible blade constituting the flexible transport and guide means forming the switching device (3), as well as being connected together by means of expandable parts (20).

7. Pneumatic conveyor according to claim 6, characterized by the fact that each individual rigid box-shaped part (18) is in the form of a case forming a guide rail (18') in its lower part for the products or bottles (6) to be transported or conveyed, whereby this guide rail (18') of the individual rigid box-shaped parts (18) forming the means (10) for propelling the products (6) is equipped with nozzles (18") for blowing compressed air in the direction of transport of the products (6) to be transported and cooperates with the means (8) for guiding and holding in place the upper ends of the products (6) to be transported.

8. Pneumatic conveyor according to claim 6, characterized by the fact that each crosspiece (19) for an individual rigid box-shaped part (18) is attached to the base of the flexible blade constituting the flexible transport and guide means forming the switching device (3) by short weld spots.

9. Pneumatic conveyor according to claim 6, characterized by the fact that each crosspiece (19) for an individual rigid box-shaped part (18) is attached to the base of the flexible blade constituting the flexible transport and guide means forming the switching device (3) by hooking a hook in the middle of its upper part into a corresponding hole made in the switching device (3).

10. Pneumatic conveyor according to claim 1, characterized by the fact that the supports (7) of the means (8) for guiding and holding in place and the mounting devices (11) for the additional guide means (9) are each mounted on an individual rigid box-shaped part (18) forming the means (10) for propelling the products (6) to be transported , and the individual rigid box-shaped parts (18) are modular and are connected together by expandable parts (20) that are also modular, whereby the individual rigid box-shaped parts (18) are mounted on the flexible blade forming the switching device (3), at regular intervals, by means of their crosspiece (19).

11. Pneumatic conveyor according to claim 6, characterized by the fact that the individual rigid box-shaped parts (18) are in the form of parts with progressively increasing length from the fixed end (3') of the flexible blade forming the switching device (3) in the direction of the free end (3") of this blade, whereby the crosspieces (19) of the individual rigid box-shaped parts (18) are distributed over the length of the flexible blade forming the switching device (3) with a spacing that increases from the fixed end (3') of the flexible blade forming the switching device (3) in the direction of the free end (3") of this blade, and the expanding parts (20) are the same.

12. Pneumatic conveyor according to claim 1, characterized by the fact that the free end (3") of the flexible transport and guide means forming the switching device (3) is equipped with a guide device (13) on the support infrastructure (4) that consists essentially of a sliding guide that fits around a guide plate or track (14) that is part of the support infrastructure (4).

13. Pneumatic conveyor according to claim 12, characterized by the fact that the sliding guide forming the guide device (13) on the support infrastructure (4) consists of two sliding parts (13') running parallel on each side of the guide plate or track (14) that is part of the support infrastructure (4), resting above and below against the corresponding faces of the guide plate or track (14) and attached to the free end (3") of the flexible transport and guide means forming the switching device (3), these sliding parts (13') comprise a low friction resistance.

14. Pneumatic conveyor according to claim 12, characterized by the fact that the sliding guide forming the guide device (13) on the support infrastructure (4) consists of one of sliding runners and rollers mounted on the free end (3") of the flexible transport and guide means forming the switching device (3).

15. Pneumatic conveyor according to claim 1, characterized by the fact that the reciprocating movement means (5) consists of at least one double-acting jack (15) whose piston rod is connected to the free end (3") of the flexible transport and guide means forming the switching device (3) by means of a guide cap (16) on the support infrastructure (4) that extends from the free end (3") and acts as a connector to that free end (3").

* * * * *